Figure 1:
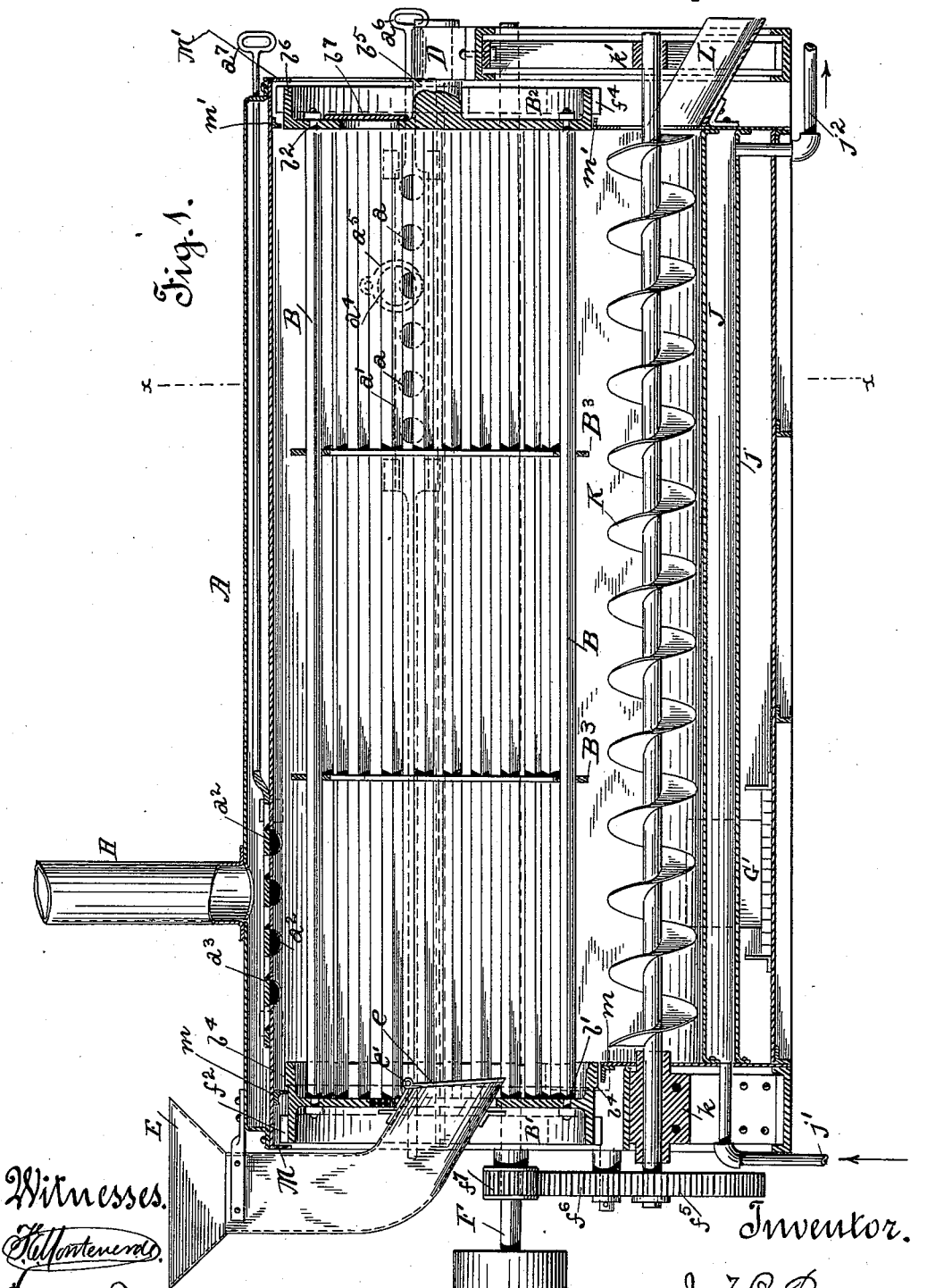

(No Model.) 2 Sheets—Sheet 1.

J. W. BARNES.
MACHINE FOR REDUCING BITUMINOUS OR ASPHALTIC COMPOUNDS.

No. 568,596. Patented Sept. 29, 1896.

Witnesses.
Inventor.
J. W. Barnes
by A. H. Ste Marie
atty (No Model.) 2 Sheets—Sheet 2.
J. W. BARNES.
MACHINE FOR REDUCING BITUMINOUS OR ASPHALTIC COMPOUNDS.
No. 568,596. Patented Sept. 29, 1896.
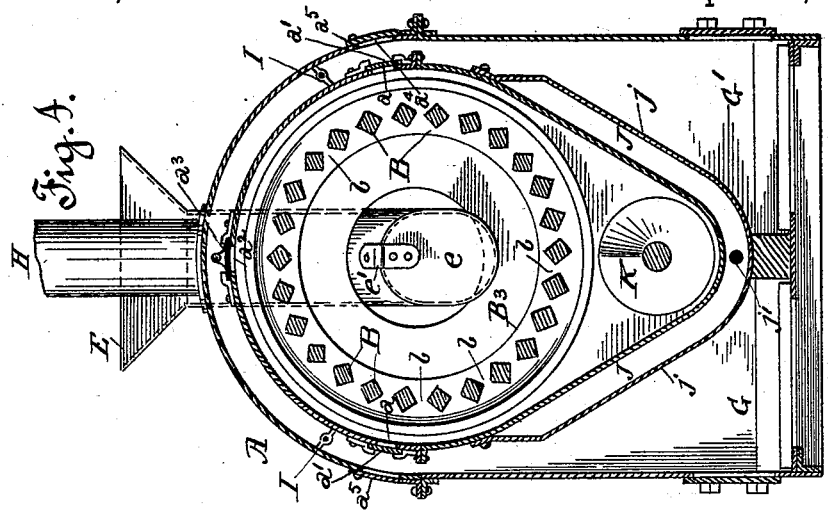
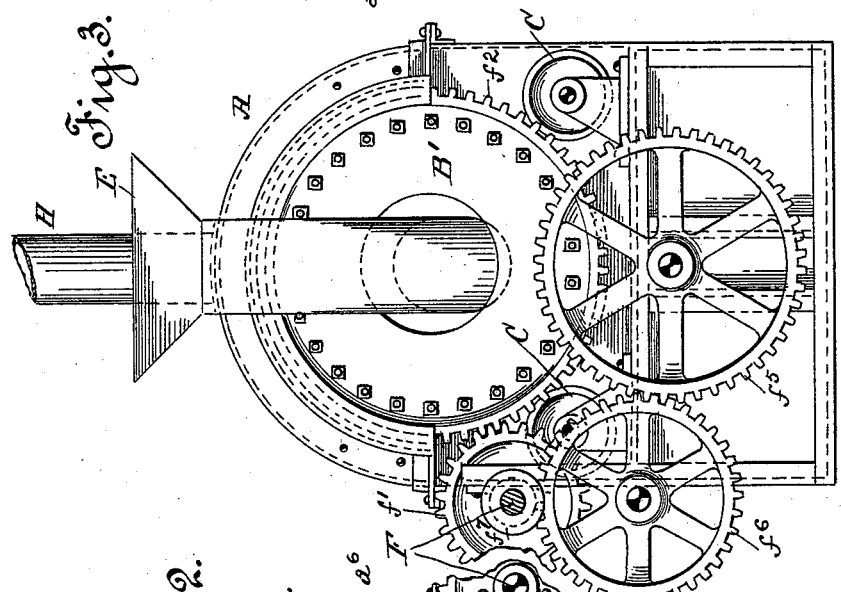
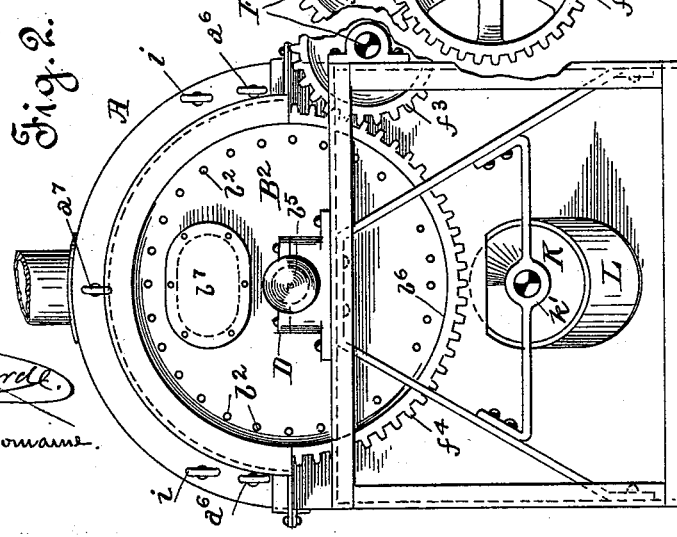
Witnesses.
Inventor.
J. W. Barnes
by
A. H. Ste Marie
atty

UNITED STATES PATENT OFFICE.

JOSEPH W. BARNES, OF SAN FRANCISCO, CALIFORNIA.

MACHINE FOR REDUCING BITUMINOUS OR ASPHALTIC COMPOUNDS.

SPECIFICATION forming part of Letters Patent No. 568,596, dated September 29, 1896.

Application filed December 28, 1895. Serial No. 573,625. (No model.)

*To all whom it may concern:*

Be it known that I, JOSEPH W. BARNES, a citizen of the United States, and a resident of the city and county of San Francisco, State of California, have invented a new and useful Machine for Reducing Bituminous or Asphaltic Compounds, of which the following is a specification.

My invention relates to the treatment and preparation of bituminous or asphaltic substances or compounds that are used for street-pavements, foot-walks, flooring, and similar work.

The object of my said invention is to provide a practical apparatus or machine by means of which substances or compounds of the kind mentioned may be quickly and thoroughly disintegrated and fused through the combined action of mechanical forces and of fire heat directly applied, but tempered by the indirect application of steam. To this end I have devised the apparatus or machine illustrated in the drawings hereunto annexed, in which—

Figure 1 is a longitudinal sectional elevation; Fig. 2, an end view of the discharge end of the machine; Fig. 3, a similar view of the hopper end thereof; and Fig. 4, a cross-section on the line $x\ x$ of Fig. 1, looking to the left.

In said figures the letter A represents the body of the machine, which consists of a double shell of suitable dimensions made of wrought-iron plates riveted together. Within this shell is placed a reel or cage composed of an endless series of cylindrically-arranged bars or rods B, having interstices $b$ between them.

By preference the bars B are made quadrangular in cross-section and are set into heads or end disks B′ B², being inserted into holes $b'\ b^2$ therein and secured in place by nuts $b^3$. The said bars are also passed through rings B³, which help to keep them in proper position. The reel is supported within the shell by means of rollers C, upon which a flange $b^4$, formed around the front disk B′, is made to bear, and by a trunnion $b^5$, projecting rearwardly from the back head B² and journaled in a box D. It is in this reel that the material to be disintegrated and melted in the machine is first placed, the feeding being done through a hopper E, suspended from the upper front end of the shell and fitted into a suitable opening in the head B′. This hopper is closed at the lower end, inside the reel, by a swinging door $e$, which is put on by hinges $e'$, so that it may hang down in the position illustrated at Fig. 1 and remain normally shut. The material having been introduced into the reel, the latter is rotated, so as to break it up on the bars B and cause it to fall down in a comminuted state through the interstices $b$ between the same. The rotary movement is imparted through the agency of a shaft F, which extends alongside of the shell and is driven by a belt-pulley $f$, or else by a sprocket-wheel and chain or other suitable power connections. The shaft F turns a small gear-wheel $f'$, meshing with a larger gear $f^2$, that forms an integral part of the head B′. It also turns another gear-wheel $f^3$, likewise engaged with a larger gear $f^4$, formed on the periphery of a flange $b^6$ on the head B² and constituting an integral part of the same. The reel is thus made to revolve with a continuous uniform motion and operates to break up the lumps of bituminous rock or other bituminous or asphaltic substance placed therein.

While the bituminous material is rotated with the reel it is also subjected to the action of heat in order that it may be softened and reduced to that plastic and pulpy condition in which it is fit for use. This heat is applied first in the shape of hot air, which is produced within the walls of the shell and can be controlled in such a manner that it may be either brought into actual contact with the material under treatment or simply allowed to circulate within the walls of the shell, as preferred. For this purpose I provide fireplaces G G′, located, preferably, one on each side of the machine at the bottom of the shell. These can be arranged to burn coal, wood, oil, or any other desirable fuel. The products of combustion, it will be seen, will spread throughout the shell, between the walls composing the same, and naturally rise up to the smoke-stack H, through which they will escape into the atmosphere if left unchecked; but I place dampers I in the upper part of the shell, on both sides, to shut off the exit in that direction and divert the fire heat toward the central space inclosed by the inner walls of the shell, where it can reach the reel through a number of holes $a$, controlled by slides $a'$. When admitted into the reel, the fire heat will come into direct contact with the material therein and melt it, thereby coacting with the bars of the reel in reducing it to the desired condition. From the reel the hot air can be let out into the upper part of the shell, and thence into the chimney through a row of holes $a^2$, controlled by a perforated slide $a^3$. These holes can be kept open and still the air in the reel can be maintained at a fairly high temperature, as the heat will get in faster at the sides than it will go out at the top, as will be readily understood. The temperature can be raised by shutting the dampers and stopping the top row of holes, while the side holes are uncovered. On the other hand, it can be lowered by opening the dampers and top row of holes and putting the slides over the side holes. Holes $a^4$, covered by swinging plates or doors $a^5$, are further provided in the outer walls of the shell for the admission of cold air into the apparatus in case there should be any danger of its becoming overheated. These holes are located opposite the rows of side holes $a$, so that they may let the cold air enter into the space occupied by the reel, as also into the fireplaces, should occasion arise. The fire heat can therefore be quickly subdued and the apparatus and its contents cooled off before any serious damage can be done. The heat is thus put under full control and can be managed in such a manner as to accomplish the best results always. The slides $a'$ $a^3$ and dampers I, it will be observed, are each provided with a handle $a^6$, $a^7$, and $i$, projecting at the rear end of the shell, where they all can be reached and worked conveniently by the fireman or some other attendant from one end of the machine.

From the interstitial reel the disintegrated and fused material falls into a receiving steam-jacket J, formed in the under part of the machine by the inner wall of the shell and a plate $j$, secured to the under side thereof. This jacket is preferably trough-shaped and is designed to give the bituminous or asphaltic compound the final treatment before the same is ejected from the machine. There the compound is subjected to the indirect action of steam, which is injected into the jacket J by means of an inlet-pipe $j'$ at one end and let out at the other end through an exhaust-pipe $j^2$. Both these pipes are provided with suitable regulating-valves. (Not shown.) The material falling into and contained within the jacket, it will be noted, would naturally tend to absorb the heat from the steam therein and cool off or condense the same, but as the jacket is at the same time more or less under the influence of the heat arising from the fireplaces underneath the steam is kept dry and sufficiently hot to keep the material in the jacket at the proper temperature. While the material contained in the receiving-jacket is being subjected to the indirect action of steam, as aforesaid, it is further cut up and mixed by means of a spiral conveyer K, located in the bottom of the jacket and running throughout the entire length thereof. The shaft of this conveyer is journaled in suitable boxes $k$ $k'$, located, respectively, at the front and rear ends of the machine, and is rotated by means of a gear-wheel $f^5$, which is set in motion by an idler-wheel $f^6$, engaged by a pinion $f^7$, set upon the shaft F. The blades on the conveyer-shaft are arranged so as to further comminute the broken and melted material falling from the reel and convey the same toward the rear end of the machine, where it is expelled by the conveyer through a discharge spout or chute L. The expelled material is then ready for use and can be laid down for the work it is intended in any approved manner.

A hood M is provided at the front end of the shell and a similar one, M', at the rear end in order to protect the gearing and also to confine the hot air as much as possible within the interior of the shell, where the reel is located. Angle-irons $m$ $m'$ are also placed both at the front and rear of the machine for the same purpose.

The back head $B^2$ is provided with a suitable manhole $b^7$, as shown, in order to afford means for cleaning the inside of the reel when desired.

Having described my invention, what I claim, and desire to secure by Letters Patent of the United States, is—

1. A machine of the character described comprising a perforated double shell, a reel mounted therein, and one or more fireplaces whereby heat may be conveyed directly to said reel through the holes in said shell, substantially as set forth.

2. A machine of the character described comprising a double shell the inner wall of which is perforated at the sides and top, an interstitial reel therein, and one or more fireplaces whereby heat may be conveyed to said reel through the side holes in said shell and thence let out through the top holes thereof, substantially as set forth.

3. A machine of the character described comprising a double shell the outer wall of which is provided with a smoke-stack and whose inner wall has side and top holes, a reel mounted within said shell, one or more fireplaces located within the walls of the shell, and one or more dampers and slides adapted to control the passage of the heat through said smoke-stack and said holes, substantially as set forth.

4. A machine of the character described comprising a double shell provided with suitable openings to afford passages for either hot or cold air and also provided with a smoke-stack, a reel mounted in said shell, and slides, doors, and dampers whereby control is had over the air-passages and the smoke-stack, substantially as set forth.

5. A machine of the character described comprising an outer shell, a reel therein, a receiving steam-jacket below said reel, a conveyer, and one or more fireplaces located within said shell under said jacket, substantially as set forth.

6. In a machine of the character described, a rotary reel composed of bars or rods united by heads the rims whereof are formed into gears by means of which the reel is rotated, substantially as set forth.

In testimony whereof I affix my signature in presence of two witnesses.

JOSEPH W. BARNES. [L. S.]

Witnesses:
A. H. STE. MARIE,
HENRY P. TRICOU.